United States Patent [19]

Yoshizawa et al.

[11] Patent Number: 4,831,858
[45] Date of Patent: May 23, 1989

[54] DRIVING APPARATUS FOR VERTICAL ROLLING MILL

[75] Inventors: Isamu Yoshizawa; Ginjiro Yanai; Seiichi Matsuda, all of Kanagawa, Japan

[73] Assignees: FEC Co., Ltd., Tokyo; Fuji Electric Co., Ltd., Kanagawa, both of Japan

[21] Appl. No.: 130,896

[22] Filed: Dec. 10, 1987

[30] Foreign Application Priority Data

Jan. 30, 1987 [JP] Japan .................... 62-20063

[51] Int. Cl.⁴ .................. B21B 35/14; H02K 7/00
[52] U.S. Cl. ........................ 72/249; 310/80; 310/82; 310/157
[58] Field of Search .......... 72/249, 225, 235, 224; 310/80, 82, 157

[56] References Cited

U.S. PATENT DOCUMENTS

| | | | |
|---|---|---|---|
| 2,696,131 | 12/1954 | Peterson | 72/249 X |
| 2,927,488 | 3/1960 | Petereit | 72/249 X |
| 3,298,214 | 1/1967 | Stubbs et al. | 72/249 X |
| 3,765,212 | 10/1973 | Moslener | 72/249 |
| 3,828,600 | 8/1974 | Borisenko et al. | 72/249 |
| 4,389,865 | 6/1983 | Davies | 72/249 X |
| 4,441,352 | 4/1984 | McDonagh et al. | 72/249 |
| 4,513,599 | 4/1985 | Harris | 72/249 X |

Primary Examiner—Robert L. Spruill
Assistant Examiner—Steven B. Katz
Attorney, Agent, or Firm—Finnegan, Henderson, Farabow, Garrett & Dunner

[57] ABSTRACT

A driving apparatus for a vertical rolling mill comprises a vertical electric motor mounted on a frame which has a hollow rotary shaft therein supported by a bearing and surrounding a portion of an intermediate shaft. The upper end of the intermediate shaft extends through the hollow rotary shaft and connects to a first universal joint disposed axially above the motor, and which engages the upper end of the hollow rotary shaft. The torque of the hollow rotary shaft is transmitted to the vertical roll through the first universal joint of the intermediate shaft, and a second universal joint.

6 Claims, 3 Drawing Sheets

DRIVING APPARATUS FOR VERTICAL ROLLING MILL

BACKGROUND OF THE INVENTION

The present invention relates to driving apparatus for rolling mill and more particularly, for vertical rolling mill having a vertical roll.

A conventional driving apparatus for a vertical rolling mill comprises a horizontal electric motor 1 and a gear mechanism 2 as shown in FIG. 2. the drive shaft 1a of the horizontal electric motor 1 extends to apply motive power to the gear mechanism 2 mainly made of bevel gears (not shown). The direction of transmission of the motive power is changed by an angle of approximately 90° by a universal joint (not shown) disposed in the gear mechanism 2. The output shaft (not shown) of the gear mechanism 2 is connected to the upper end of an intermediate shaft 3 by an upper universal joint (not shown). The lower end of the intermediate shaft 3 is connected to the upper end of a vertical roll 5 by lower universal joint 4, thus transmitting the motive power to vertical roll 5.

The conventional driving apparatus of FIG. 2 has several disadvantages: gear mechanism 2 is large in size; the cost of gear mechanism 2 is high because of the need to use high-grade gears; maintenance of the gears in gear mechanism 2 is difficult; horizontal electric motor 1 needs a separate installation space; and separate equipment such as a concrete base is required for mounting motor 1.

In order to eliminate these disadvantages, another driving apparatus was developed with a vertical electric motor positioned above the vertical roll as shown in FIG. 3. The vertical electric motor 11 is positioned on the frame 10 of the vertical rolling mill. The lower end of the drive shaft 11a of the vertical electric motor 11 extends below bearing 12 and is connected to the upper end 13a of an intermediate shaft 13 by a first universal joint 14a. The lower end 13b of the intermediate shaft 13 is connected to the upper end of a vertical roll 15 by a second universal joint 14b. Motive power is thus transmitted from the motor 11 to the vertical roll 15. Although the above-mentioned disadvantages associated with the drive shown in FIG. 2 are eliminated by the driving apparatus shown in FIG. 3, the apparatus of FIG. 3 has the disadvantage of increased overall height due to the additional height of the vertical electric motor 11. Existing building dimensions may be insufficient for installing the vertical rolling mill of FIG. 3. If so, remodeling or new construction would be necessary. It is therefore desirable to provide for a driver for a vertical rolling mill which does not suffer from the disadvantages of the drivers shown in FIGS. 2 and 3.

SUMMARY OF THE INVENTION

Accordingly, an object of the present invention is to provide a driving apparatus for a vertical rolling mill having a vertical electric motor as its driving power source, which is relatively inexpensive, easy to maintain and readily installed in existing buildings without the necessity of structural modifications.

To achieve the foregoing objects, and in accordance with the invention as embodied and broadly described herein, a driving apparatus for a vertical rolling mill is provided comprising a vertical electric motor, mounted on a frame and having a hollow rotary shaft supported by a bearing and surrounding a portion of an intermediate shaft within is disposed over the vertical rolling mill uncoaxially therewith; or in other words offset from the axis of the rolling mill. The upper end of the intermediate shaft extends through the hollow rotary shaft, and is connected through a first universal joint axially above the motor to the hollow rotary shaft. The lower end of the intermediate shaft is connected to the upper end of the vertical roll by a second universal joint.

The longitudinal axis of the intermediate shaft forms an oblique angle with the vertical axis of the hollow shaft depending upon the variable position of the intermediate shaft in relation to the position of the vertical roll.

Since the upper portion of the intermediate shaft is located in the hollow rotary shaft of the vertical electric motor disposed over the vertical roll, the height of the vertical rolling mill is reduced by that of the vertical electric motor. Therefore, the vertical rolling mill can be installed in an existing building without remodeling it.

DETAILED DESCRIPTION OF PREFERRED EMBODIMENT

Reference will now be made in detail to the present preferred embodiment of the invention as illustrated in the accompanying drawings.

Figure 1:
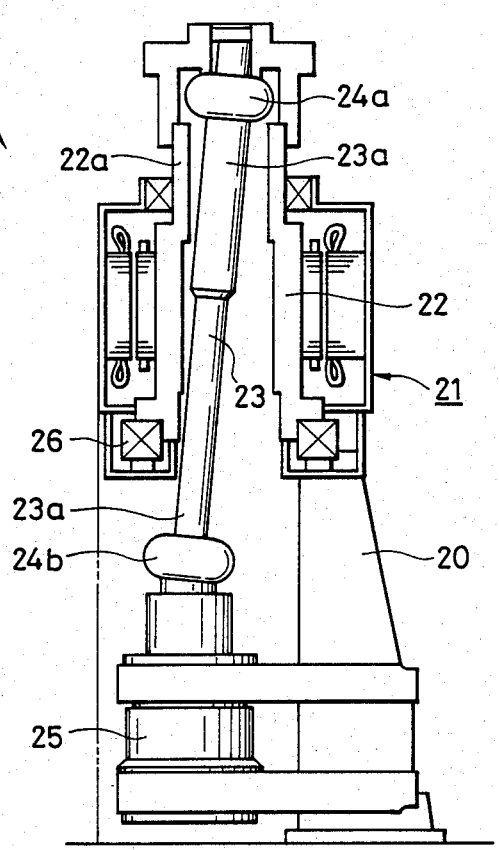
FIG. 1 shows a side view of a driving apparatus for a vertical rolling mill incorporating the teachings of the present preferred embodiment of the invention.
Figure 2:
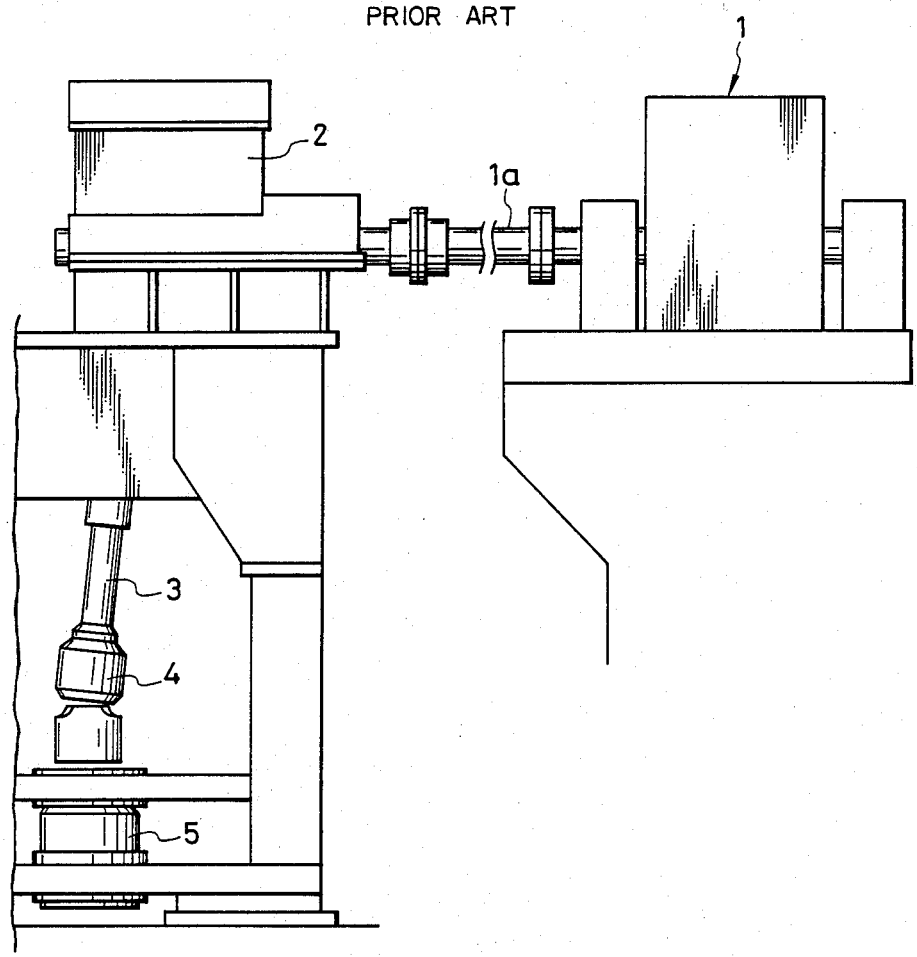
FIG. 2 shows a side view of a conventional driving apparatus for a vertical rolling mill.
Figure 3:
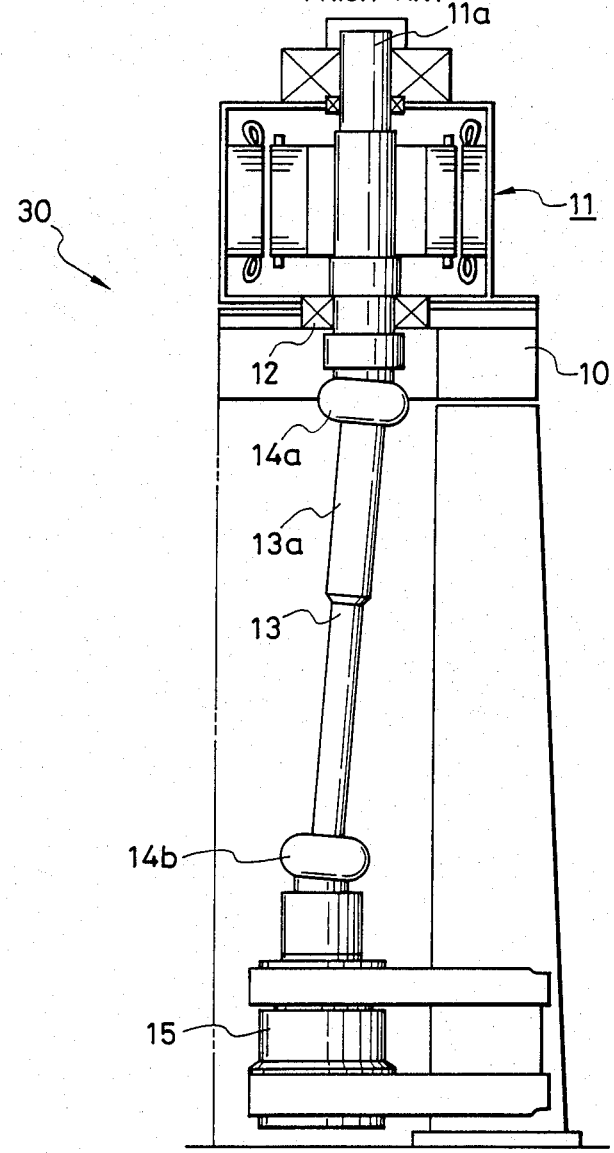
FIG. 3 shows a side view of another conventional driving apparatus for a vertical rolling mill.

A preferred embodiment of the present invention is shown in FIG. 1 and is represented generally by the numeral 10. In accordance with the invention, vertical roll driving apparatus 10 comprises a vertical electric motor having a hollow rotary shaft and mounted on a frame. As embodied herein, and referring to FIG. 1, vertical electric motor 21 mounted on frame 20 is offset from the axis of the vertical roll 25. Motor 21 has within it a hollow rotary motor shaft or armature shaft 22 supported by bearing 26. Upper end 23a of an intermediate shaft 23, which extends downwardly through the hollow rotary shaft 22 at an oblique angle to the vertical axis thereof, is connected to hollow shaft 22 by a first universal joint 24a which is attached to the upper end 22a of hollow rotary shaft 22 axially above the motor 21. The lower end 23b of the intermediate shaft 23 is connected to the upper end of a vertical roll 25 by a second universal joint 24b. As a result, the torque of the vertical electric motor 21 is transmitted from the hollow rotary shaft 22 to the vertical roll 25 through the first universal joint 24a, the intermediate shaft 23 and the second universal joint 24b.

It will be apparent to those skilled in the art that various modifications, variations and additions can be made to the present invention without departing from the spirit or scope of the present invention. Thus, it is intended that the present invention cover the modifications and variations provided they come within the general scope of the claims and their equivalents.

What is claimed is:

1. A driving apparatus for a vertical rolling mill, comprising:

a frame having a lower end portion and an upper end portion vertically disposed above said lower end portion;

a vertical roll having a vertically extending axis mounted adjacent said lower end portion;

an electric motor having a stator and armature shaft with a hollow interior mounted on said upper end portion, said motor having a vertically extending axis of rotation;

a first universal joint attached to said hollow shaft and disposed above said upper end portion of the frame;

a second universal joint attached to said vertical roll; and an intermediate shaft, having an upper end extending into said hollow shaft, attached to said first universal joint, and having a lower end attached to said second universal joint for driving said vertical roll.

2. A driving apparatus for a vertical rolling mill according to claim 1, wherein the first universal joint is disposed axially above the electric motor.

3. A driving apparatus for a vertical rolling mill according to claim 1, wherein the motor is disposed on the upper end portion of the base with the vertically extending axis of rotation being offset from the vertically extending axis of the vertical roll.

4. A driving apparatus for a vertical rolling mill according to claim 1, wherein the armature shaft has a hollow interior with a first axially extending portion of a first diameter adjacent the first universal joint and a second axially extending portion with a second diameter greater than the first diameter adjacent the first axially extending portion for accommodating the motion of said intermediate shaft during rotation of the armature shaft.

5. A driving apparatus for a vertical rolling mill according to claim 4, wherein the motor shaft includes armature windings surrounding said second axially extending portion.

6. A driving apparatus for a vertical rolling mill according to claim 1, further comprising bearing members mounted on the upper end of said frame interposed between the armature shaft and frame for rotatably supporting said armature.

* * * * *